(12) United States Patent
Pedrazzini et al.

(10) Patent No.: US 6,693,400 B2
(45) Date of Patent: Feb. 17, 2004

(54) MULTI-MODE MOTOR CONTROLLER CHIP SET

(75) Inventors: Giorgio Pedrazzini, Rancho Santa Margarita, CA (US); Hin Sing Fong, Singapore (SG); Krishnamoorthy Ravishanker, Singapore (SG)

(73) Assignee: STMicroelectronics, Inc., Carrollton, TX (US)

( * ) Notice: Subject to any disclaimer, the term of this patent is extended or adjusted under 35 U.S.C. 154(b) by 123 days.

(21) Appl. No.: 09/978,958

(22) Filed: Oct. 16, 2001

(65) Prior Publication Data

US 2003/0071593 A1 Apr. 17, 2003

(51) Int. Cl.$^7$ ................................................. G11B 5/54
(52) U.S. Cl. ........................ 318/567; 388/828; 388/829; 388/830; 388/831; 318/568.1
(58) Field of Search ................ 318/568.1; 388/828–831

(56) References Cited

U.S. PATENT DOCUMENTS 5,289,097 A * 2/1994 Erickson et al. ............ 318/561
5,838,515 A * 11/1998 Mortazavi et al. ....... 360/78.12

* cited by examiner

Primary Examiner—Rita Leykin
(74) Attorney, Agent, or Firm—Lisa K. Jorgenson; William J. Kubida (57) ABSTRACT

A multi-mode motor controller architecture includes a motor, an integrated circuit controller, and an integrated circuit driver circuit. The integrated circuit controller includes a pulse generator, a DAC, an ADC, and a digital compensator circuit. The integrated circuit driver circuit is in communication with the controller and includes an error amplifier, first and second output amplifiers for driving the motor, and a sense amplifier. The motor controller architecture is configurable to operate in a linear mode, a pulsed mode, or a switchable linear/pulsed mode. The controller architecture can be implemented with external compensation circuitry, such as a resistor-capacitor circuit, or with the digital compensation circuitry located within the controller integrated circuit.

17 Claims, 12 Drawing Sheets

Fig. 12B

MULTI-MODE MOTOR CONTROLLER CHIP SET

BACKGROUND OF THE INVENTION

This invention relates generally to motor controller circuits, and, more particularly, to a reconfigurable two-chip set motor controller.

Figure 1:
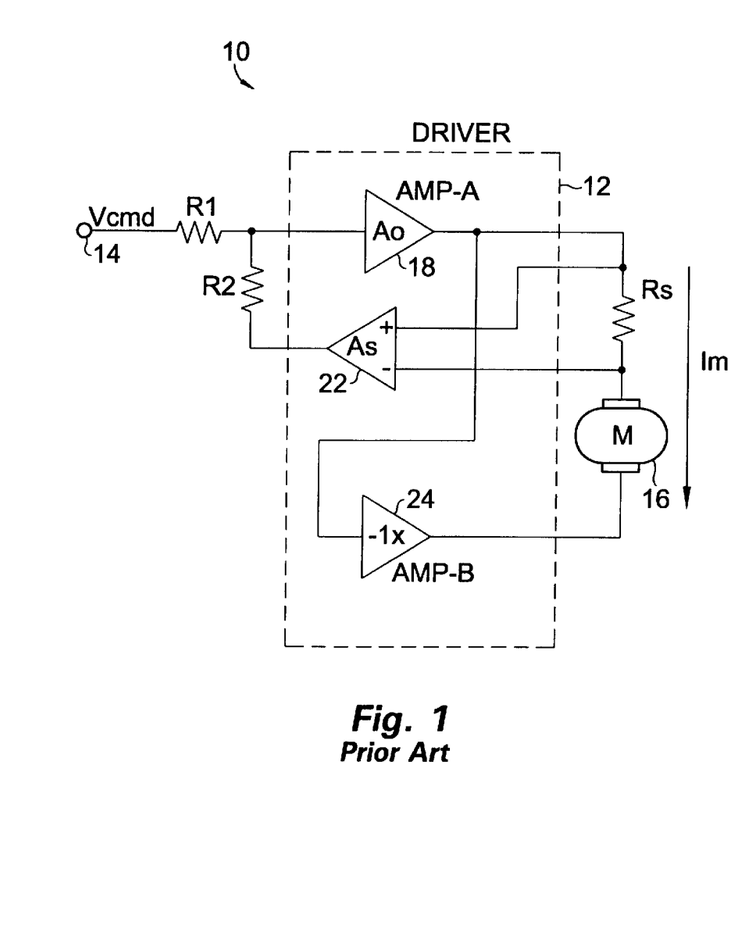
FIG. 1 is a schematic diagram of a prior art motor controller circuit in which the motor is driven in the linear current mode.

Referring now to FIG. 1, a typical voice control motor (VCM) 16 is driven in a linear current mode in prior art motor controller configuration 10. Driver circuit 12 includes a first amplifier 18, a second amplifier 24, and a sense amplifier 22. The current, Im, driven into motor 16 is proportional to the control voltage, Vcmd, applied at circuit node 14. In the steady state, the motor current, Im, is given by the following equation:

$$Im=(R2/R1)\times(Vcmd/(Rs\times As))$$

where resistors R1, R2, and Rs are external to the driver circuit 12 and can be modified as required for a desired current gain for a specific application. The first amplifier 18 is used as an error amplifier, while the second amplifier 24 is used as a fixed gain stage. The control or command voltage Vcmd can be any value within a specified range and the commanded or motor current, Im, will be given by the above equation. System 10 shown above in FIG. 1 is therefore continuous.

Figure 2:
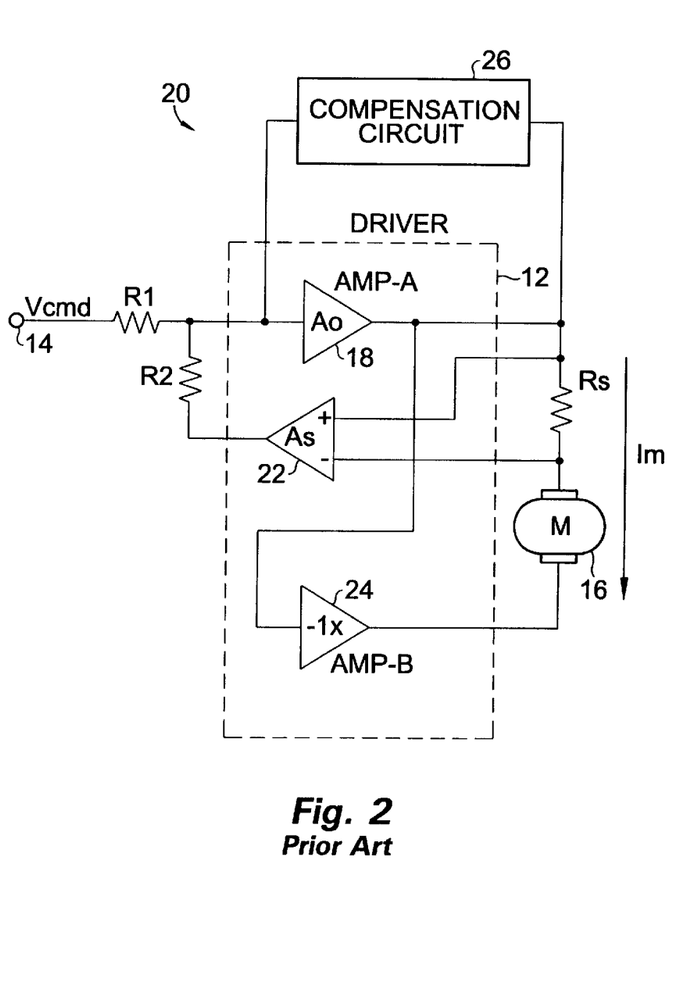
FIG. 2 is a schematic diagram of a prior art motor controller circuit in which the motor is driven in the linear current mode and further including an external compensation circuit.

Referring now to FIG. 2, a compensated system 20 includes an external compensation circuit 26 to make the system stable. Compensation circuit is typically a simple passive circuit like a combination of a resistor and capacitor or other passive elements.

The driver circuit configurations 10 and 20 shown in FIGS. 1 and 2 are typical for driving a VCM and the circuit elements must be changed to provide different operating modes, such as a pulsed mode of operation. While the circuit configurations 10 and 20 are simple and provide a stable operating system, it is inconvenient to change circuit elements to provide additional operating modes and restricts system versatility to adapt to changing load conditions.

What is desired, therefore, is a motor controller architecture that is easily reconfigurable for use in several operating modes and able to work in conjunction with a wide variety of controller circuits.

SUMMARY OF THE INVENTION

It is, therefore, a principal object of the present invention to provide a multi-mode motor controller architecture that is easily reconfigurable to operate in several modes and able to work in conjunction with a wide variety of controller circuits.

It is an advantage of the present invention that the motor can be driven in different modes without a need to change the circuit elements.

It is a further advantage of the present that new modes of operation can be evaluated or used in addition to established, conventional modes of operation.

According to the present invention a multi-mode motor controller architecture includes a motor, an integrated circuit controller, and an integrated circuit driver circuit. The integrated circuit controller includes a pulse generator, a DAC, an ADC, and a digital compensator circuit. The integrated circuit driver circuit is in communication with the controller and includes an error amplifier, first and second output amplifiers for driving the motor, and a sense amplifier. The motor controller architecture is configurable to operate in a linear mode, a pulsed mode, or a switchable linear/pulsed mode. The controller architecture can be implemented with external compensation circuitry, such as a resistor-capacitor circuit, or with the digital compensation circuitry located within the controller integrated circuit.

The foregoing and other objects, features and advantages of the invention will become more readily apparent from the following detailed description of a preferred embodiment of the invention which proceeds with reference to the accompanying drawings.

DETAILED DESCRIPTION

Figure 3:
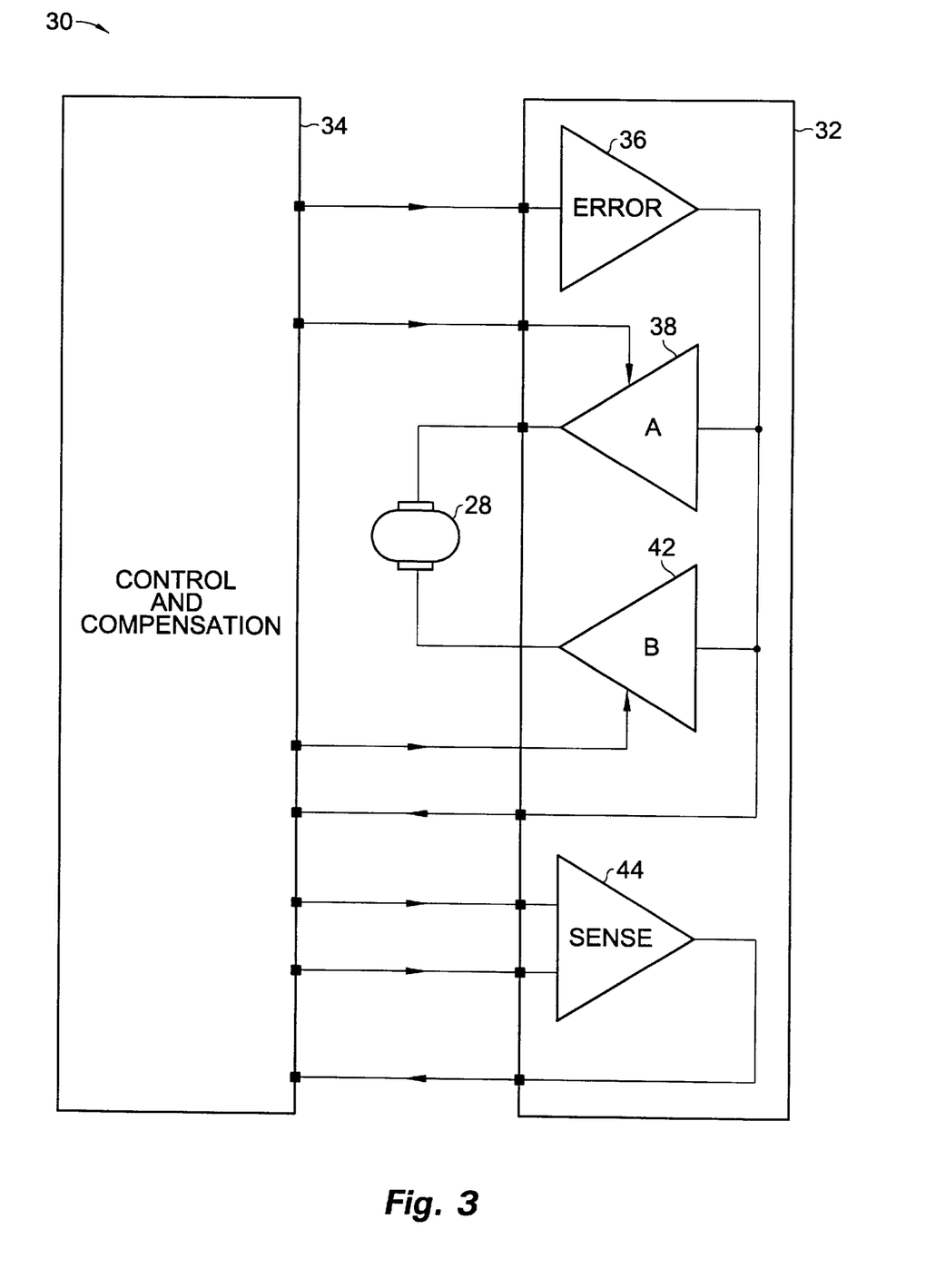
FIG. 3 is a simplified schematic/block diagram of a multi-mode integrated circuit motor controller according to the present invention including a controller chip and a driver chip.

Referring now to FIG. 3, a generalized and simplified schematic/block diagram of a multi-mode integrated circuit motor controller chip set 30 includes a controller chip 34 and a driver chip 32. The controller chip 34 includes various control and compensation circuitry, which is described in further detail below. The driver chip 32 includes an error amplifier 36, first and second amplifiers 38 and 42 for driving a voice-coil motor (VCM) 28, and a sense amplifier 44. All of the amplifiers are in communication with the control chip 34 for receiving input or gain-setting information, or for transmitting output information.

Figure 4:
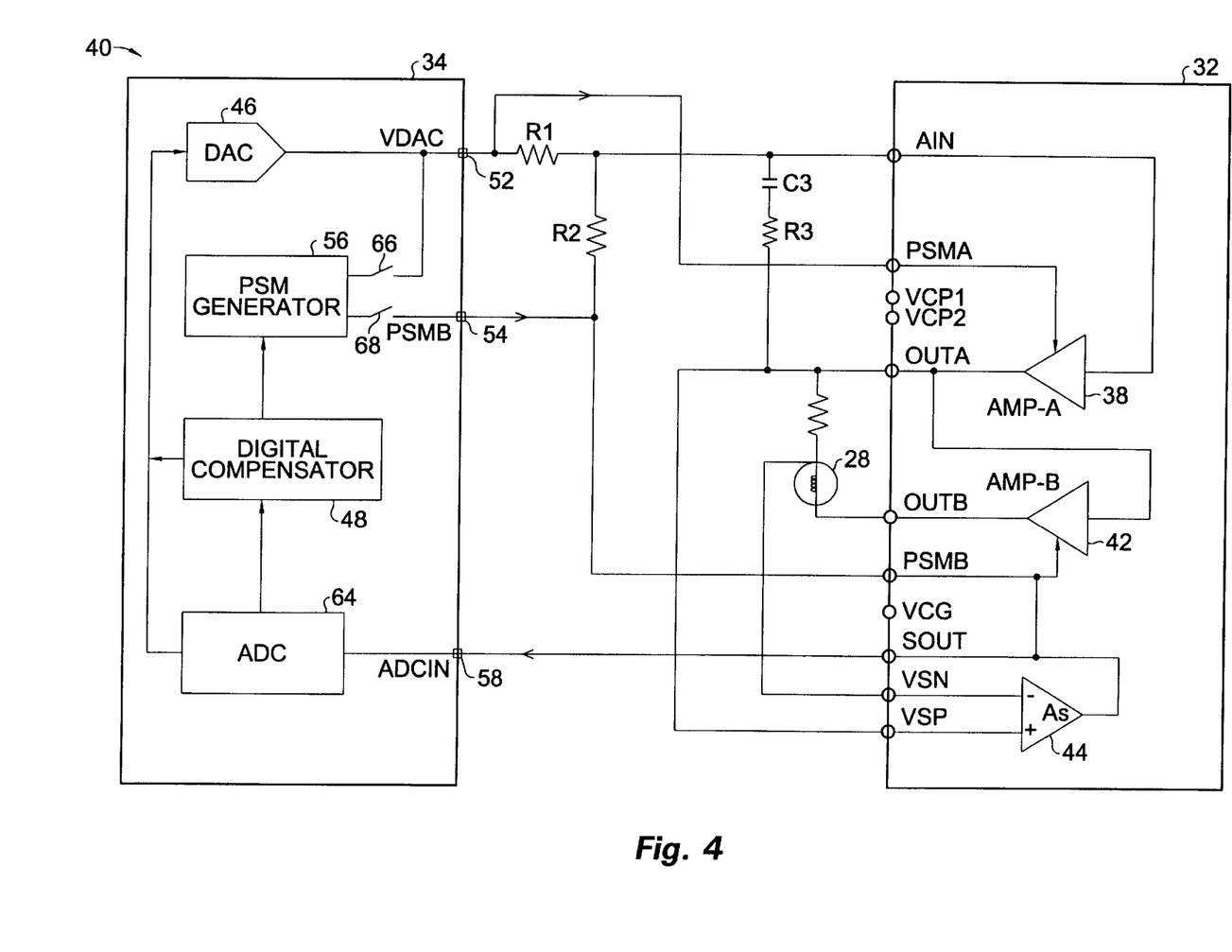
FIG. 4 is a schematic diagram of a multi-mode integrated circuit motor controller according to the present invention including a controller chip and a driver chip configured in the linear current mode and further including external compensation.

Referring now to FIG. 4, a schematic diagram of a multi-mode integrated circuit motor controller 40 is shown including a controller chip 34 and a driver chip 32 configured in the linear current mode and further including external compensation (resistor R3 and capacitor C3). The controller chip 34 includes a digital to analog converter (DAC) 46 having an output for providing the VDAC command voltage at node 52. Controller chip 34 also includes a phase shift modulation(PSM) pulse generator 56, a digital compensation circuit 48, and an analog to digital converter (ADC) 64. It is important to note that pulse generator 56, digital compensation circuit 48, ADC 64, as well as switches 66 and 68, while resident on the controller chip 34, are not active (or open in the case of switches 66 and 68) and therefore not used during the linear mode of operation as is depicted in FIG. 4. Amplifier 38, amplifier 42, and sense amplifier 44 in the driver chip 32 are all active during the linear mode of operation.

Figure 5:
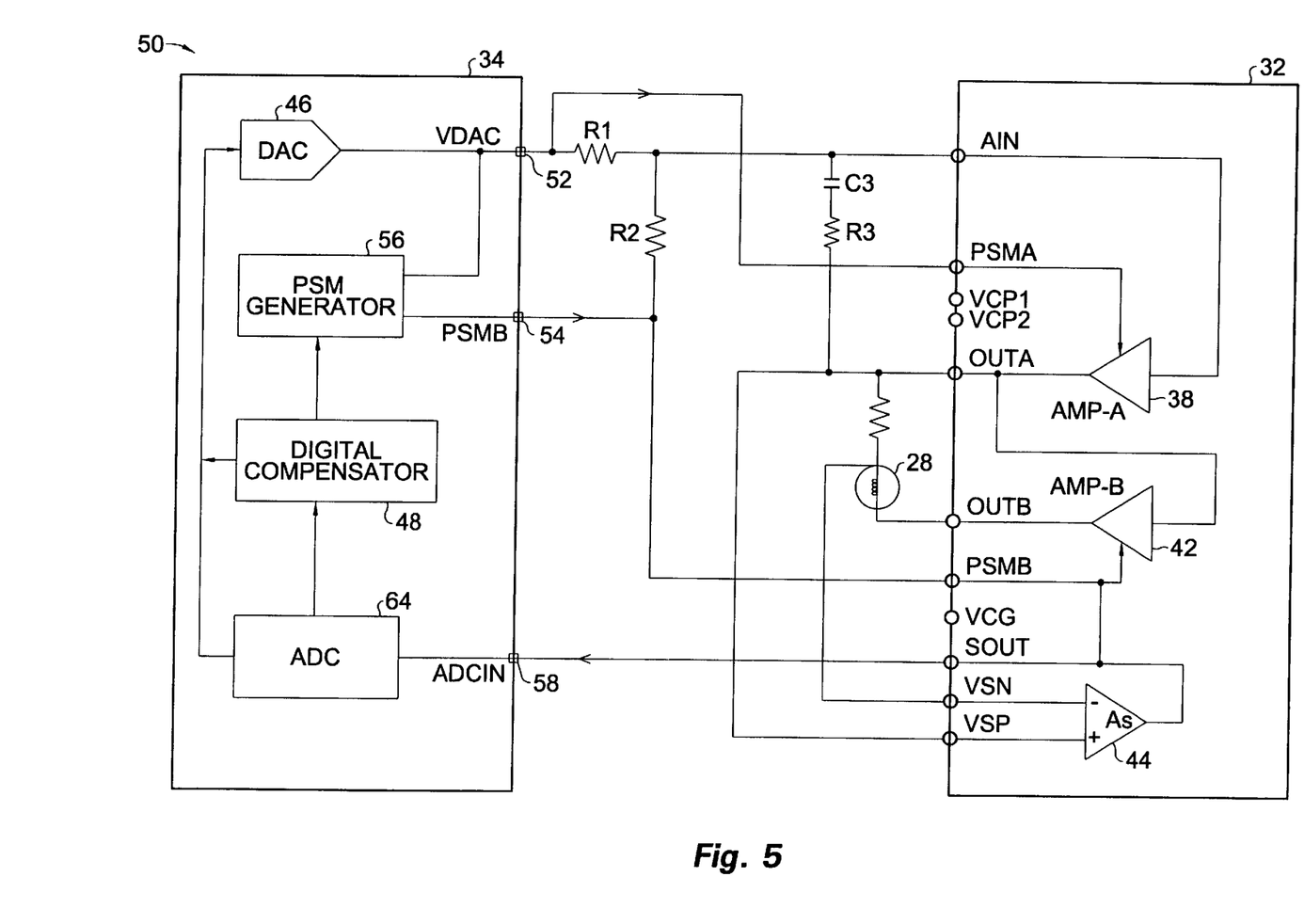
FIG. 5 is a schematic diagram of a multi-mode integrated circuit motor controller according to the present invention including a controller chip and a driver chip configured in the pulsed mode and further including external compensation.

Referring now to FIG. 5, a schematic diagram of a multi-mode integrated circuit motor controller 50 is shown including a controller chip 34 and a driver chip 32 configured in the pulsed current mode and further including external compensation (resistor R3 and capacitor C3). The controller chip 34 includes a DAC 46 which is not active during the pulsed current mode. Controller chip 34 also includes PSM pulse generator 56 for providing first and second output signals designated PSMA and PSMB at nodes 52 and 54, a digital compensation circuit 48 having outputs coupled to pulse generator 56 and DAC 46, and an ADC 64 having outputs coupled to digital compensation circuit 48 and DAC 46, and an input for receiving the ADCIN input signal at node 58. It is important to note that pulse generator 56, digital compensation circuit 48, and ADC 64 are all active and therefore used during the switching mode of operation as is depicted in FIG. 5. As in the previously described linear mode, amplifier 38, amplifier 42, and sense amplifier 44 in the driver chip 32 are all active during the pulsed mode of operation.

Figure 6:
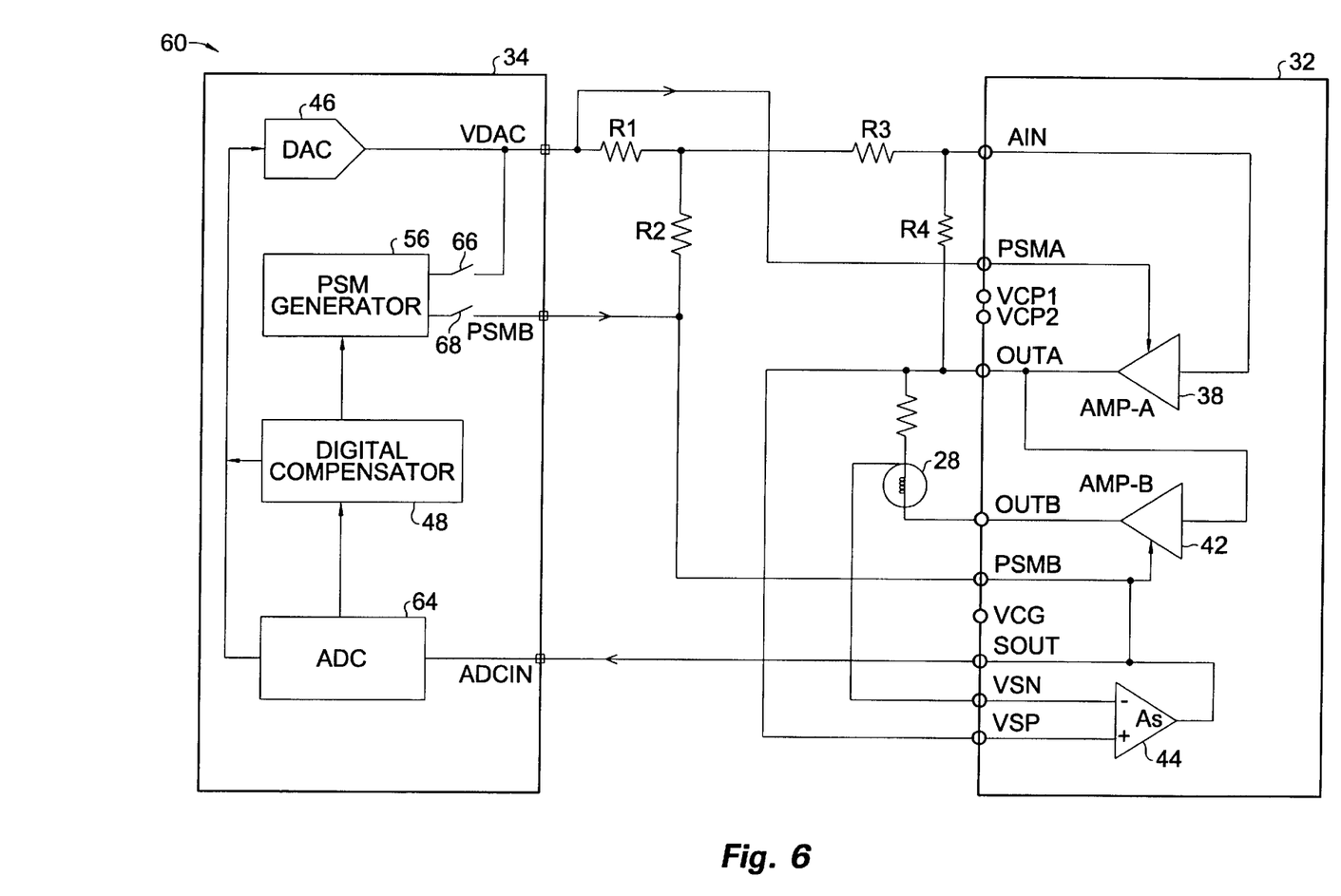
FIG. 6 is a schematic diagram of a multi-mode integrated circuit motor controller according to the present invention including a controller chip and a driver chip configured in the linear mode and further including digital compensation.

Referring now to FIG. 6, a schematic diagram of a multi-mode integrated circuit motor controller 60 is shown including a controller chip 34 and a driver chip 32 configured in the linear current mode and further including digital compensation. In the linear current mode, using digital compensation, it is important to note that pulse generator 56 is not used and switches 66 and 68 are therefore open. Digital compensation circuit 48, ADC 64, and DAC 46 are all active in the digitally compensated linear mode of operation. As in the previously described operational mode, amplifier 38, amplifier 42, and sense amplifier 44 in the driver chip 32 are all active during the digitally compensated linear mode of operation.

Figure 7:
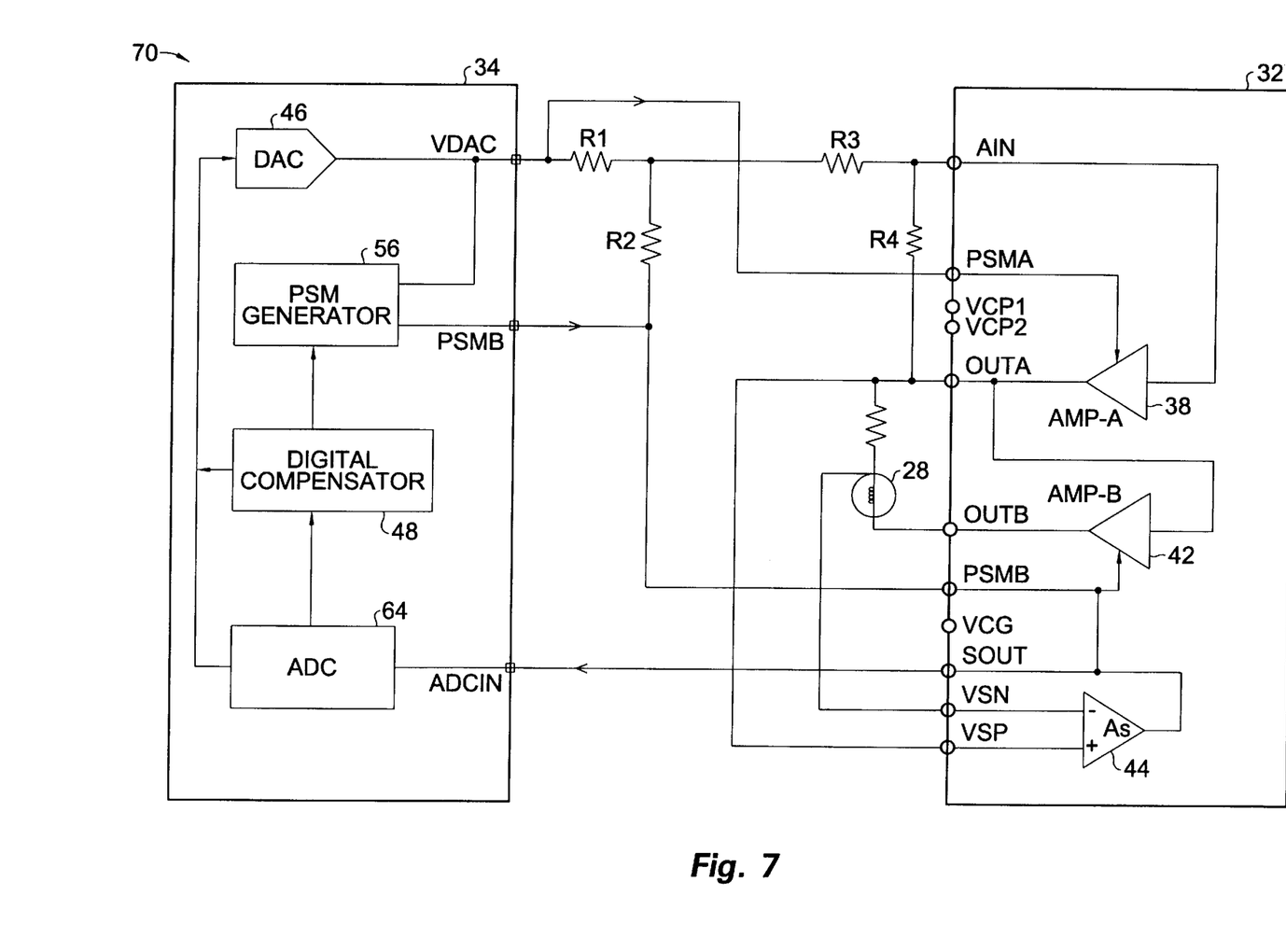
FIG. 7 is a schematic diagram of a multi-mode integrated circuit motor controller according to the present invention including a controller chip and a driver chip configured in the pulsed mode and further including digital compensation.

Referring now to FIG. 7, a schematic diagram of a multi-mode integrated circuit motor controller 70 is shown including a controller chip 34 and a driver chip 32 configured in the pulsed current mode and further including digital compensation. DAC 46 is not active during the digitally compensated pulsed current mode. It is important to note that pulse generator 56, digital compensation circuit 48, and ADC 64 are all active and therefore used during the digitally compensated switching mode of operation as is depicted in FIG. 7. As in the all of the previously described operational modes, amplifier 38, amplifier 42, and sense amplifier 44 in the driver chip 32 are all active during the pulsed mode of operation.

The chip set of the present invention as described with respect to FIGS. 4–7 can be operated in either the linear mode, the pulsed mode, or can be actively switched between the two modes as desired with either external or internal digital compensation.

Referring now generally to FIGS. 8–11, the multi-mode integrated circuit motor controller chip set of the present invention is shown in schematic form using the on-chip error amplifier 44. Using error amplifier 44 reduces the circuit design complexity of the PSM generator 56 and digital compensator circuit 48. Thus, the configurations shown in FIGS. 8–11 may serve as alternative configurations to those shown in FIGS. 4–7 if desired for a particular application.

Figure 8:
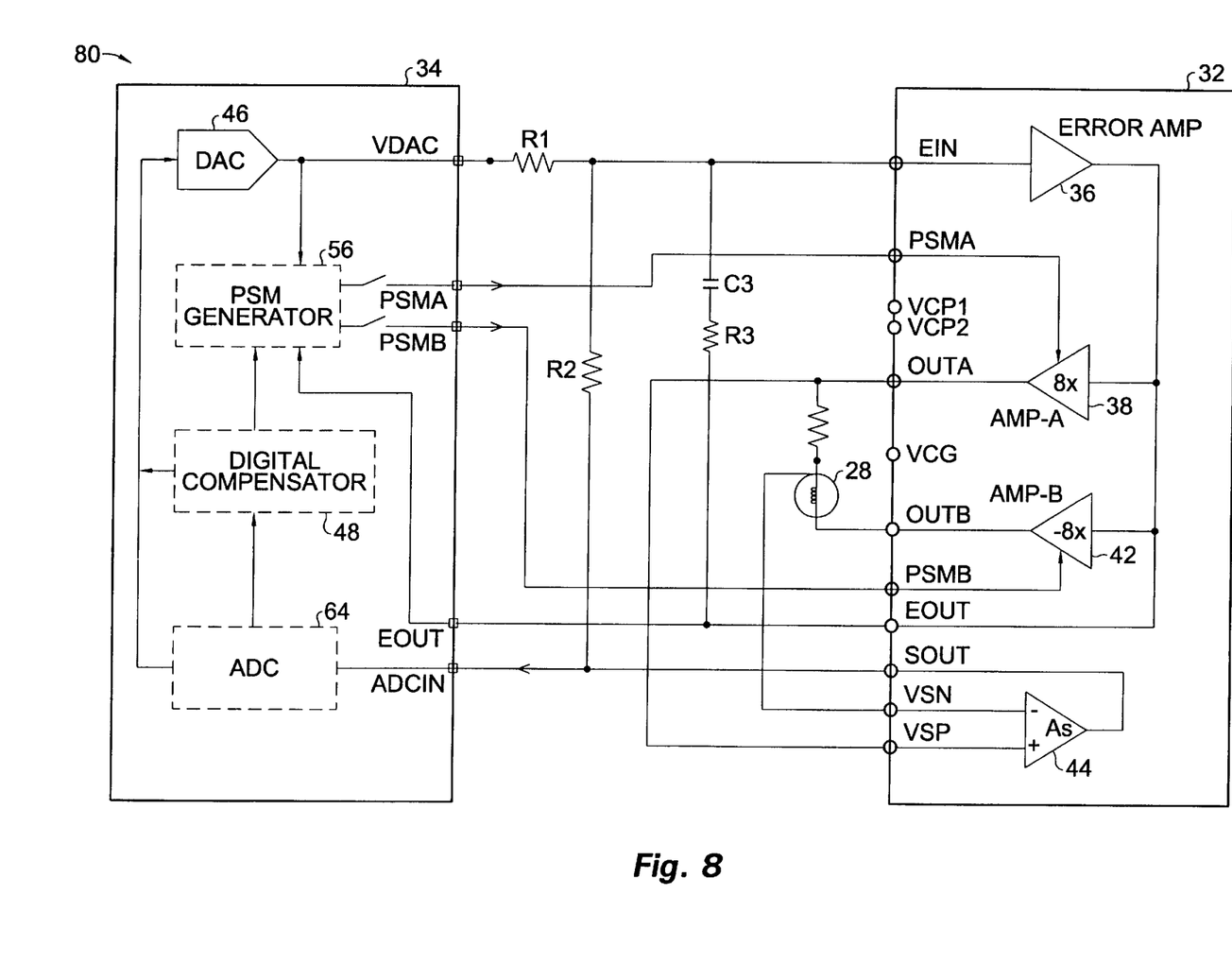
FIG. 8 is a more detailed schematic diagram of a multi-mode integrated circuit motor controller according to the present invention configured in a linear operating mode with external compensation.

Referring now to FIG. 8, a more detailed schematic diagram of a multi-mode integrated circuit motor controller 80 is shown configured in a linear operating mode with external compensation provided by the serial combination of resistor R3 and capacitor C3.

Figure 9:
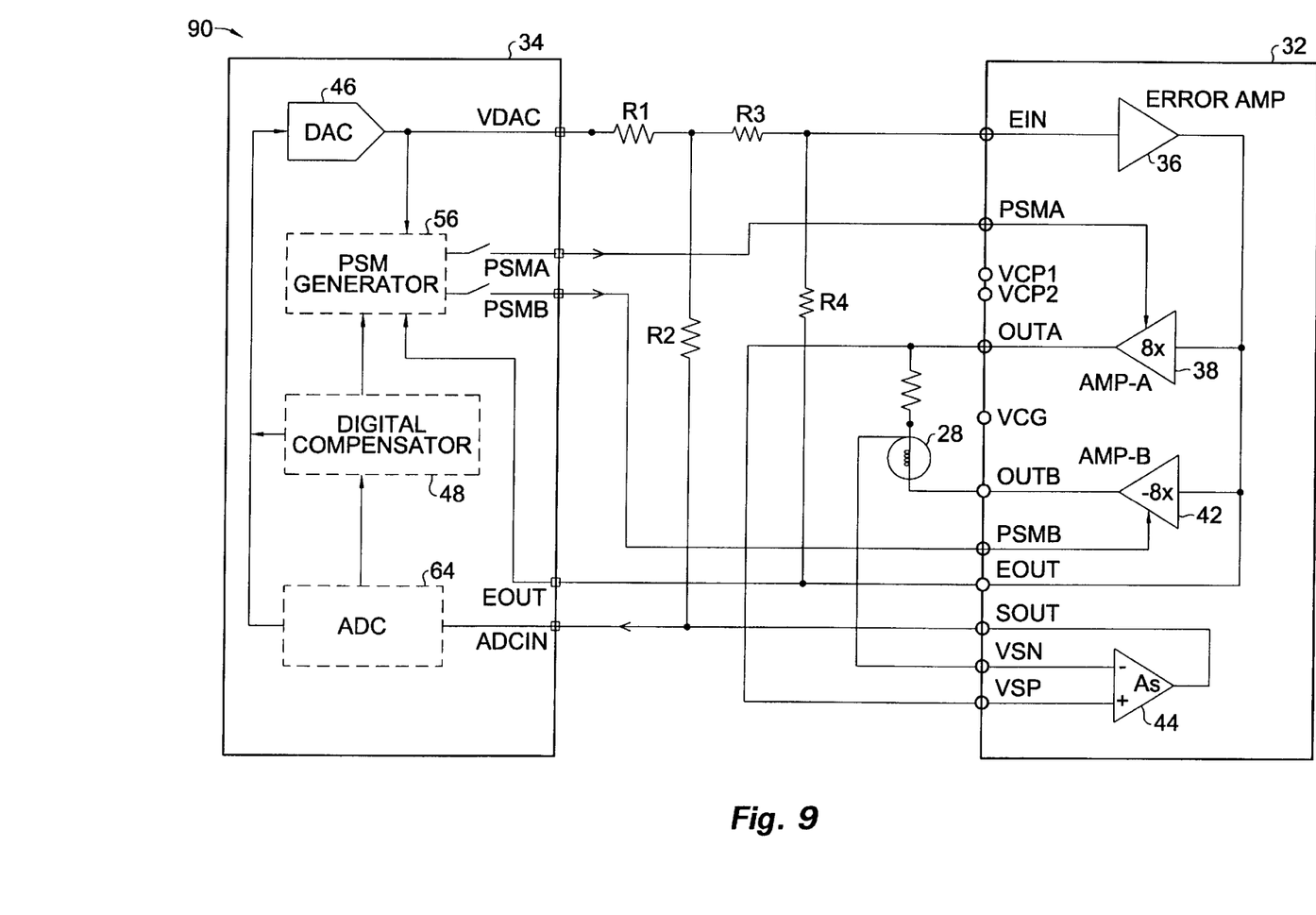
FIG. 9 is a more detailed schematic diagram of a multi-mode integrated circuit motor controller according to the present invention configured in a linear operating mode with digital compensation.

Referring now to FIG. 9, a more detailed schematic diagram of a multi-mode integrated circuit motor controller 90 is shown configured in a linear operating mode with digital compensation provided by digital compensator circuit 48.

Figure 10:
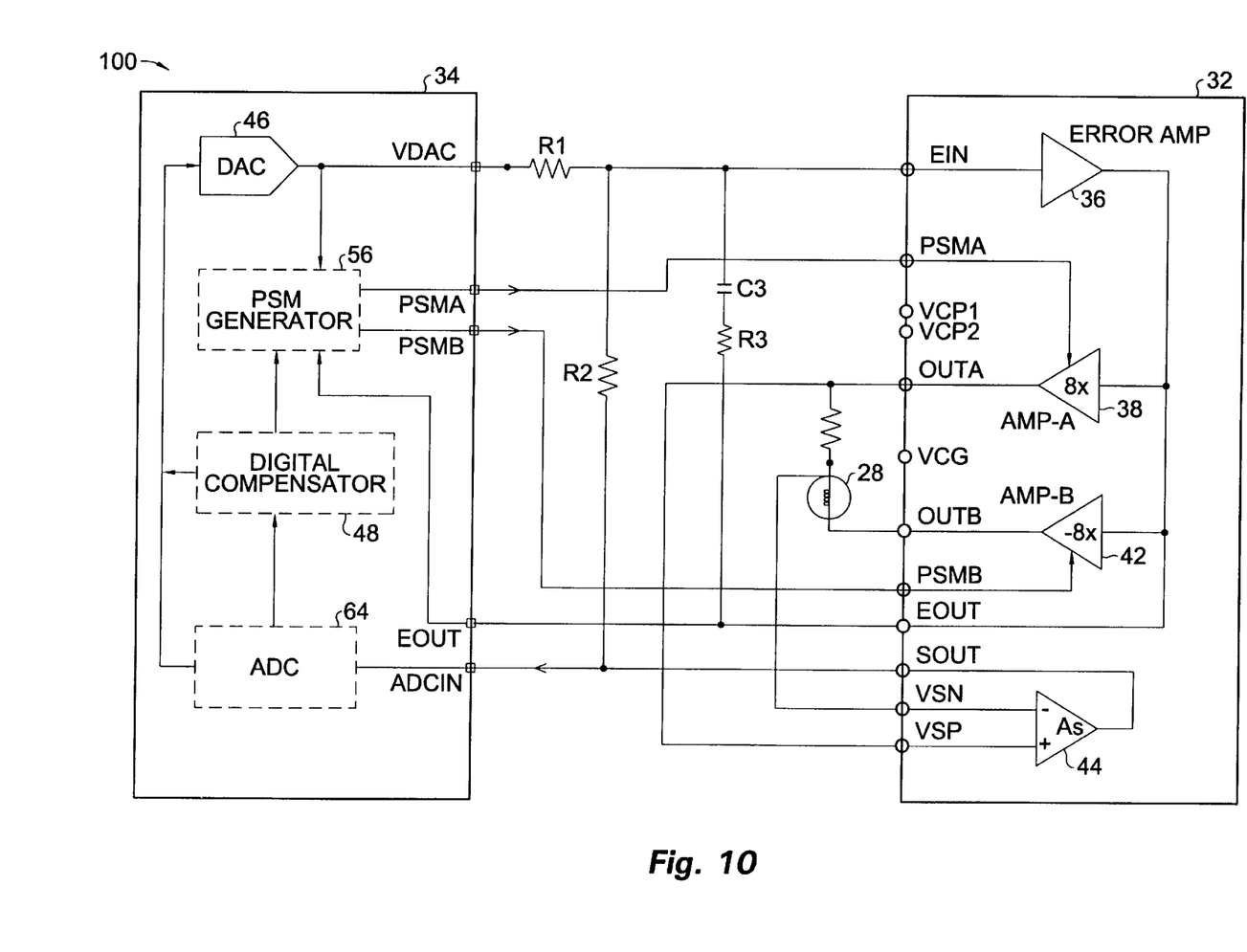
FIG. 10 is a more detailed schematic diagram of a multi-mode integrated circuit motor controller according to the present invention configured in a pulsed operating mode with external compensation.

Referring now to FIG. 10, a more detailed schematic diagram of a multi-mode integrated circuit motor controller 100 is shown configured in a pulsed operating mode. External compensation is provided by the serial combination of resistor R3 and capacitor C3, and the pulsed gain control is provided by the PSMA and PSMB outputs of pulse generator 56.

Figure 11:
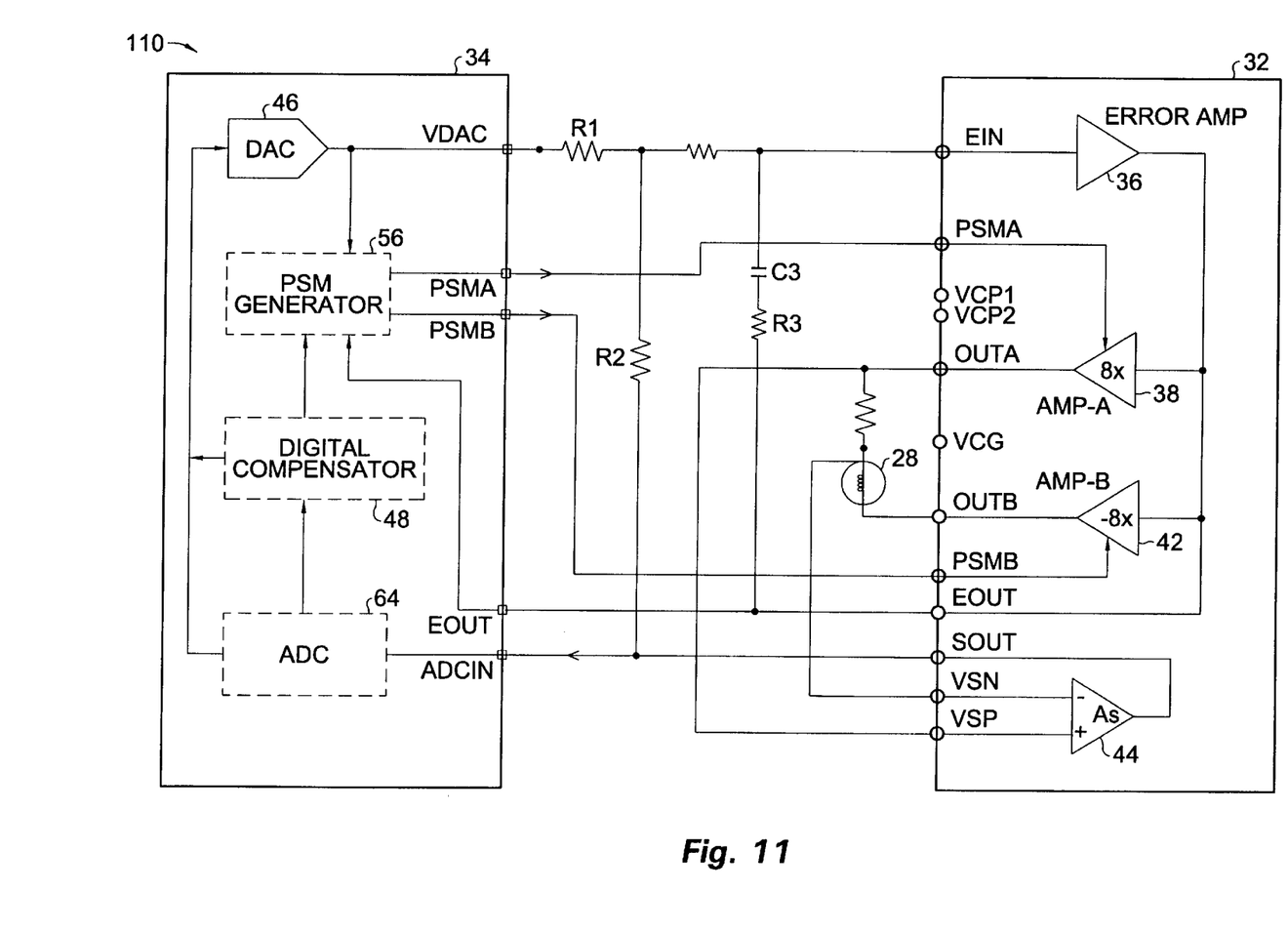
FIG. 11 is a more detailed schematic diagram of a multi-mode integrated circuit motor controller according to the present invention configured in a pulsed operating mode with digital compensation.

Referring now to FIG. 11, a more detailed schematic diagram of a multi-mode integrated circuit motor controller 110 is shown configured in a pulsed operating mode with digital compensation. The pulsed gain control is provided by the PSMA and PSMB outputs of pulse generator 56 and the compensation is provided by digital compensator circuit 48.

Figures 12, 12A:
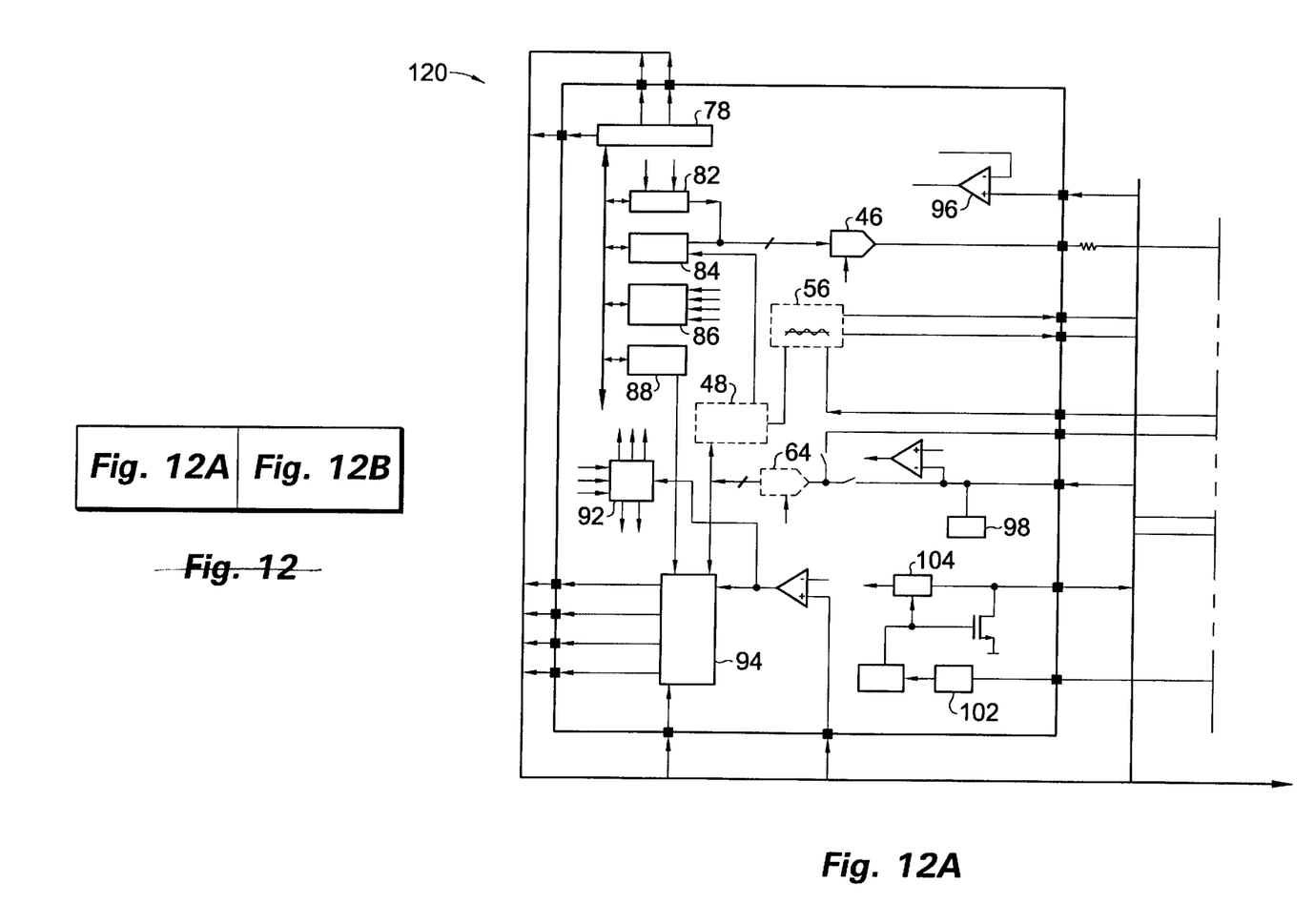
FIG. 12A is a detailed schematic diagram of the controller integrated circuit according to the present invention.

Referring now to FIG. 12A, a highly detailed schematic diagram of the controller integrated circuit 120 is shown including, in addition to the previously described circuitry, an embedded digital micro-controller 78 for controlling the functions of the device on instructions from the software, a digital park register 82 for storing a park function, a digital DAC register 84 for storing DAC settings, a digital VCM control register 86 for storing VCM settings, digital smooth core registers 88 for storing spindle control settings, brake/park control circuitry 92 for determining the timing and voltage for braking of the spindle motor and parking of the VCM actuator, smooth core circuitry 94 for controlling spindle functions, reference voltage buffer amplifier 96 for buffering the reference input voltage, voltage sense circuitry 98 for sensing the thermal voltage from driver circuit 130 to determine chip temperature, UV detect circuitry 102 for sensing the supply voltages to detect a minimum operating voltage threshold, and power-on reset detect circuitry 104 for generating a master reset pulse.

Figure 12B:
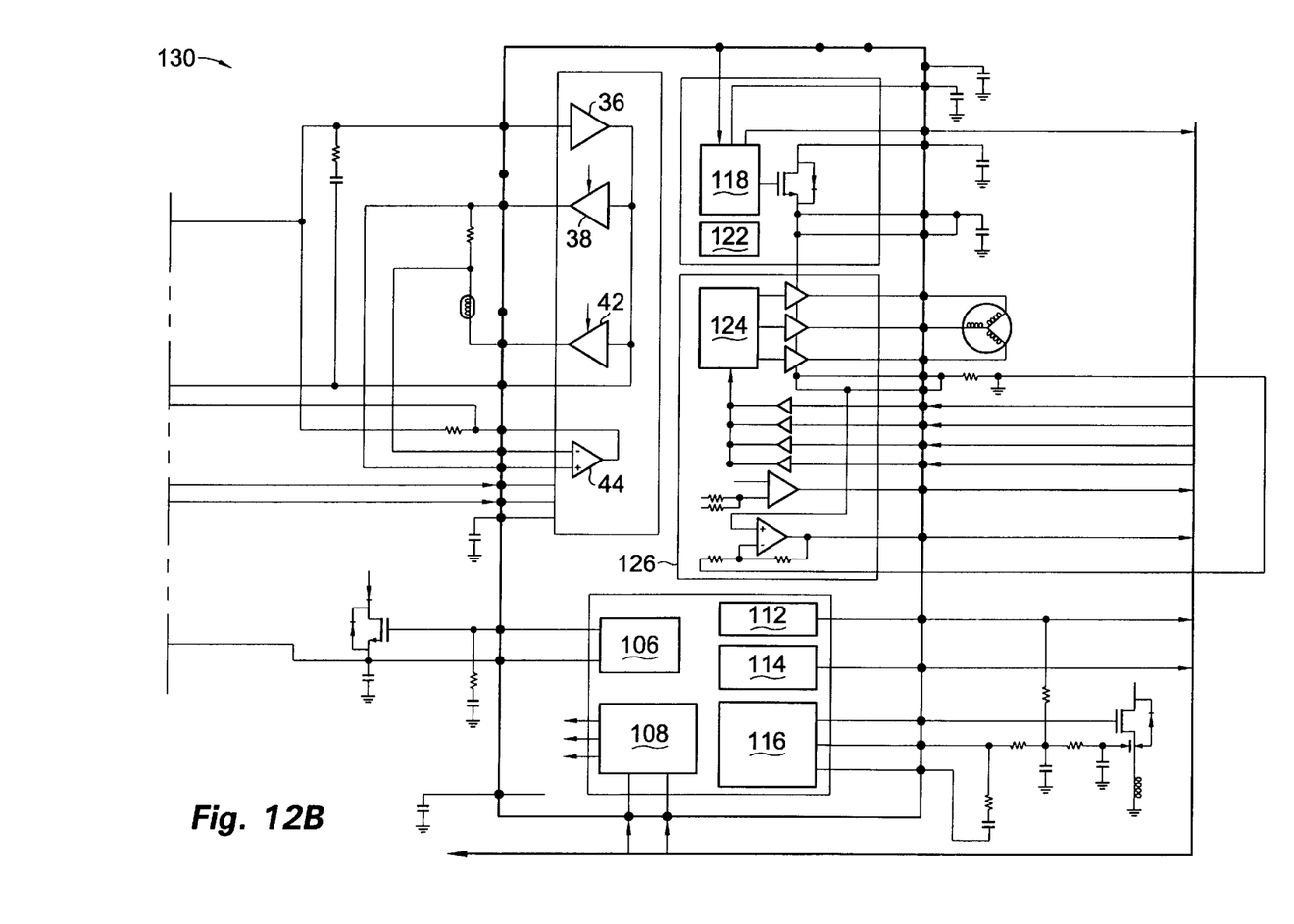
FIG. 12B is a detailed schematic diagram of the driver circuit according to the present invention.

Referring now FIG. 12B, a highly detailed schematic diagram of the driver circuit 130 is shown including, in addition to the previously described circuitry, a 3.3 volt regulator 106 for regulating the on-board 3.3 volt power supply, a serial port 108 for providing the digital interface to the controller chip 120, a voltage reference buffer amplifier 112 for generating the reference voltage, a thermal sense circuit 114 to measure the chip temperature, a negative switching regulator 116 for generating a negative voltage supply, a charge pump circuit 118 for generating the high drive voltage, a voltage power clamp circuit 122 for clamping the motor supply voltage to operate within specified operating limits, a pre-driver circuit 124 for controlling the switching on and off of the spindle power drivers, and a spindle block 126, which is a collection of circuit for driving the spindle motor.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

We claim:

1. A multi-mode motor controller architecture comprising:
   a motor;
   a controller producing a voltage signal;
   a driver circuit in communication with the controller, the driver circuit comprising:
     an error amplifier receiving the voltage signal from the controller and producing an output;
     first and second output amplifiers for driving the motor using the output of the error amplifier;
     a sense amplifier producing an analog output indicating current through the motor;
     an analog-to-digital converter (ADC) coupled to the sense amplifier to receive the analog output of the sense amplifier and to output a digital output;
     a digital compensation mechanism coupled to the ADC and producing an output to the controller based on the ADC digital output, wherein the controller adjusts the voltage signal based on the digital compensation mechanism output;
     wherein the motor controller architecture is configurable to operate in a linear mode, a pulsed mode, or a switchable linear/pulsed mode.

2. A multi-mode motor controller architecture as in claim 1 wherein the driver circuit further comprises nodes for coupling an external compensation network across the error amplifier and further comprising external compensation means coupled to the nodes.

3. A multi-mode motor controller architecture as in claim 2 in which the external compensation means comprises a resistor-capacitor circuit.

4. A multi-mode motor controller architecture as in claim 1 in which the controller further comprises a pulse generator coupled to the digital compensation mechanism to receive the digital compensation mechanism output.

5. A multi-mode motor controller architecture as in claim 1 in which the digital compensation mechanism comprises:
   a digital-to-analog converter (DAC) having an input, and an output coupled to at least one of the output amplifiers;
   a digital compensator circuit having an input for receiving the ADC digital output, and an output coupled to the input of the DAC.

6. A multi-mode motor controller architecture as in claim 1 in which the controller further comprises:
   a digital-to-analog converter (DAC) having an input and a switched output for selectively coupling to at least one of the output amplifiers;
   a pulse generator having an input receiving the ADC digital output and first and second outputs for selectively coupling to the first and second output amplifiers; and
   wherein the ADC is coupled to the input of the DAC.

7. A multi-mode motor controller chip set comprising:
   an controller chip producing a voltage signal; and
   a driver chip comprising:
     an error amplifier having an input coupled to receive the voltage signal from the controller and the error amplifier producing an output,
     first and second output amplifiers each having an input coupled to the output of the error amplifier and an output for driving an external motor using the output of the error amplifier,
     a sense amplifier having an output coupled to the controller indicating current though the motor,
     a digital compensation mechanism coupled to the sense amplifier output and producing a digital output to the controller chip based on the sense amplifier output, wherein the controller chip adjusts the voltage signal based on the digital compensation mechanism output; and
     wherein the motor controller chip set is configurable to operate in a liner mode, a pulsed mode, or a switchable linear/pulsed mode.

8. A multi-mode motor controller chip set as in claim 7 further comprising nodes for coupling an external compensation means across the error amplifier and external compensation means coupled to the nodes.

9. A multi-mode motor controller chip set as in claim 8 in which the external compensation means comprises a resistor-capacitor circuit.

10. A multi-mode motor controller architecture as in claim 7 in which the controller further comprises a pulse generator.

11. A multi-mode motor controller architecture as in claim 7 in which the digital compensation mechanism comprises: a digital-to-analog converter (DAC) having an input, and an output coupled to at least one of the output amplifiers; a digital compensator circuit having an input for receiving a signal proportional to a current flowing through the motor, and an output coupled to the input of the DAC.

12. A multi-mode motor controller architecture as in claim 7 in which the controller further comprises:
   a digital-to-analog converter (DAC) having an input and a switched output far selectively coupling to at least one of the output amplifiers;
   a pulse generator having an input and first and second outputs for selectively coupling to the first and second output amplifiers; and
   an analog-to-digital converter (ADC) having an input for receiving a signal from the sense amplifier and an output coupled to the input of the DAC and the digital compensation mechanism.

13. A method of controlling a motor comprising:
   providing a controller;
   producing a command voltage from the controller indicating a current to be driven in the motor;
   providing a driver circuit in communication with the controller;
   receiving the command voltage from the controller and producing a first analog output using an error amplifier;
   producing a second analog output indicating current through the motor using a sense amplifier;

digitally compensating the command voltage using the second analog output, wherein the digitally compensating comprises converting the second analog output into a digital compensation signal and providing the digital compensation signal to the controller for use in the command voltage producing;

driving the motor with first and second output amplifiers using the digitally compensated command voltage; and configuring the controller and driver circuit to operate in one of a linear mode, a pulsed mode, or a switchable linear/pulsed mode.

14. The method of claim 13 further comprising externally compensating the motor.

15. The method of claim 14 in which externally compensating the motor comprises externally compensating the motor using a resistive-capacitive circuit.

16. The method of claim 13 in which digitally compensating the motor comprises:

sensing a current flowing though the motor;

providing a sense voltage proportional to the motor current;

developing the digital compensation signal in response to the sense voltage; and generating a command signal for controlling the at least one of the output amplifiers.

17. The method of claim 13 further comprising selectively operating a digital-to-analog convener (DAC) and a pulse generator in the integrated circuit controller to provide either the linear or pulsed operating modes.

* * * * *